US008139919B2

(12) United States Patent
Schormann (10) Patent No.: US 8,139,919 B2
(45) Date of Patent: Mar. 20, 2012

(54) LIGHT TABLE EDITOR FOR VIDEO SNIPPETS

(75) Inventor: Christian Schormann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1379 days.

(21) Appl. No.: 11/693,637

(22) Filed: Mar. 29, 2007

(65) Prior Publication Data

US 2008/0244410 A1    Oct. 2, 2008

(51) Int. Cl.
 *H04N 5/93* (2006.01)
(52) U.S. Cl. .......................... 386/278; 386/282
(58) Field of Classification Search .............. 386/278, 386/282, 281, 230, 343, 351
 See application file for complete search history.

(56) References Cited

U.S. PATENT DOCUMENTS

| | | | |
|---|---|---|---|
| 5,999,173 A | 12/1999 | Ubillos | |
| 6,278,446 B1 | 8/2001 | Liou et al. | |
| 6,424,789 B1 | 7/2002 | Abdel-Mottaleb | |
| 6,636,220 B1 | 10/2003 | Szeliski et al. | |
| 6,710,785 B1 | 3/2004 | Asai et al. | |
| 6,965,723 B1 * | 11/2005 | Abe et al. ................ | 386/281 |
| 7,117,453 B2 | 10/2006 | Drucker et al. | |
| 2002/0175917 A1 | 11/2002 | Chakravarty et al. | |
| 2005/0084232 A1 | 4/2005 | Herberger et al. | |
| 2005/0132293 A1 | 6/2005 | Herberger et al. | |
| 2006/0093309 A1 | 5/2006 | Herberger et al. | |

OTHER PUBLICATIONS

Frank Shipman et al. "Hyper-Hitchcock: Towards the Easy Authoring of Interactive Video", Human-Computer interaction—INTERACT'03, M. Rauterberg et al. (Eds.), Published by IOS Press, © IFIP, 2003, pp. 33-40.
Open Source Realtime Video Editing and Effects Software: Jahshaka, published Feb. 22, 2005, retrieved from the Internet on Jan. 29, 2007 http://www.masternewmedia.org/news/2005/02/22/open_source_realtime_video_editing.htm.
Juan Casares et al. "Simplifying Video Editing Using Metadata", Symposium on Designing Interactive Systems, Proceedings of the conference on Designing interactive systems: processes, practices, methods, and techniques, 2002.
Wendy E. Mackay et al. "Video Mosaic: Laying Out Time in a Physical Space", International Multimedia Conference, Proceedings of the second ACM international conference on Multimedia, 1994.

* cited by examiner

*Primary Examiner* — Robert Chevalier (57) ABSTRACT

A light table video application includes a stackable video snippet player control, a filmstrip video snippet player control, and a timeline video snippet player control. A user may edit indicate the sequence of an edited video clip by placing one or more stackable video snippet players in a stacked fashion. A user may change the display of a stackable video snippet player control to a filmstrip video snippet player control by resizing the stackable video snippet player control. A timeline video snippet player control provides functionality for a user to drag a video player control into a sequence and place the digital video file associated with the video player at a location indicated by an insert indicator.

6 Claims, 10 Drawing Sheets

LIGHT TABLE EDITOR FOR VIDEO SNIPPETS

BACKGROUND

Typical video editing software applications are designed for video editing professionals and include a set of tools intended for creating a complete story. Such tools are focused on the editing process, providing functionality to precisely edit and polish the finished video.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a light table editing application including a stackable video snippet player control, a filmstrip video snippet player control, a timeline snippet edit control, and methods associated with each.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a light table video snippet editing system, the system described is provided as an example and not a limitation. As those skilled in the art will appreciate, the present examples are suitable for application in a variety of different types of light table video snippet editing systems.

Figure 1:
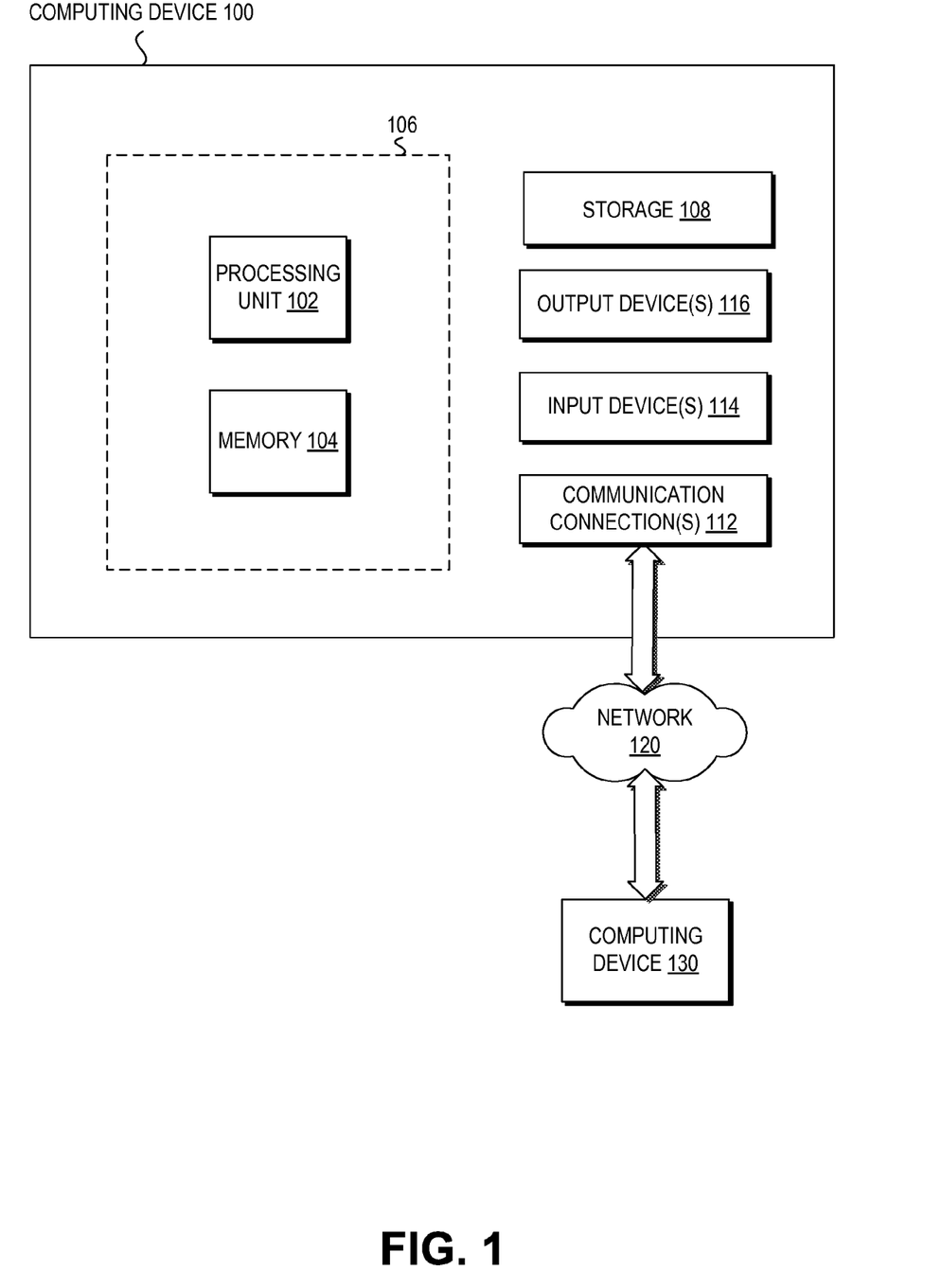
FIG. 1 shows an example of a computing device for implementing one or more embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an example of a computing device 100 for implementing one or more embodiments of the invention. In one configuration, computing device 100 includes at least one processing unit 102 and memory 104. Depending on the exact configuration and type of computing device, memory 104 may be volatile (such as RAM), non-volatile (such as ROM, flash memory, etc.) or some combination of the two. This configuration is illustrated in FIG. 1 by dashed line 106.

In other embodiments, device 100 may include additional features and/or functionality. For example, device 100 may also include additional storage (e.g., removable and/or non-removable) including, but not limited to, magnetic storage, optical storage, and the like. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 104 and storage 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also include communication connection(s) 112 that allow device 100 to communicate with other devices. Communication connection(s) 112 may include, but is not limited to, a modem, a Network Interface Card (NIC), or other interfaces for connecting computing device 100 to other computing devices. Communication connection(s) 112 may include a wired connection or a wireless connection. Communication connection(s) 112 may transmit and/or receive communication media.

Communication media typically embodies computer readable instructions or other data in a "modulated data signal" such as a carrier wave or other transport mechanism and includes any information delivery media. The term "computer readable media" may include communication media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may include input device(s) 114 such as keyboard, mouse, pen, voice input device, touch input device, infra-red cameras, video input devices, and/or any other input device. Output device(s) 116 such as one or more displays, speakers, printers, and/or any other output device may also be included in device 100. Input device(s) 114 and output device(s) 116 may be connected to device 100 via a wired connection, wireless connection, or any combination thereof. In one embodiment, an input device or an output device from another computing device may be used as input device(s) 114 or output device(s) 116 for computing device 100.

Components of computing device 100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 100 may be interconnected by a network. For example, memory 104 may be comprised of multiple physical memory units located in different physical locations interconnected by a network.

Those skilled in the art will realize that storage devices utilized to store computer readable instructions may be distributed across a network. For example, a computing device 130 accessible via network 120 may store computer readable instructions to implement one or more embodiments of the invention. Computing device 100 may access computing device 130 and download a part or all of the computer readable instructions for execution. Alternatively, computing device 100 may download pieces of the computer readable instructions, as needed, or some instructions may be executed at computing device 100 and some at computing device 130. Those skilled in the art will also realize that all or a portion of the computer readable instructions may be carried out by a dedicated circuit, such as a Digital Signal Processor (DSP), programmable logic array, and the like.

Figure 2:
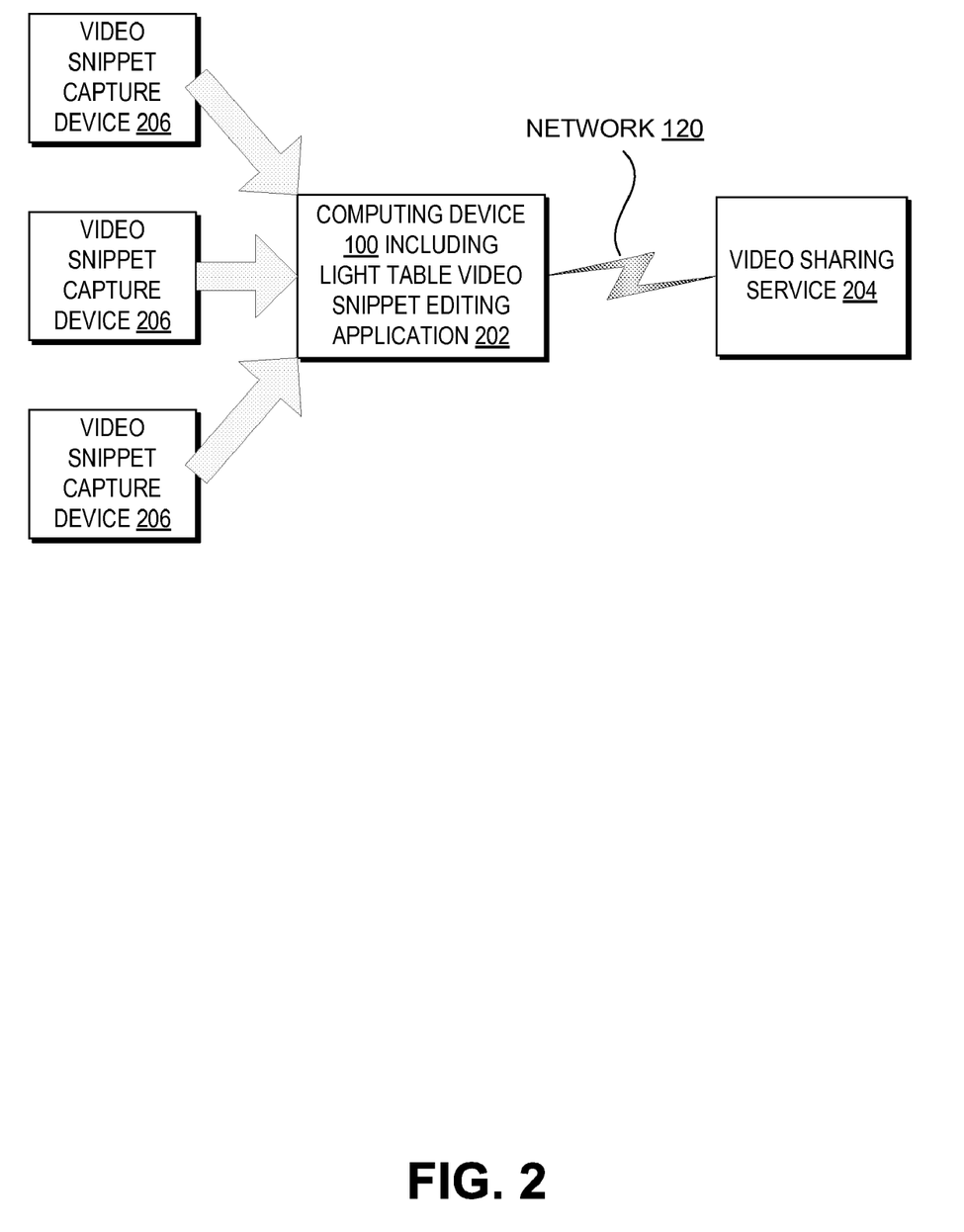
FIG. 2 shows an example system for capturing, editing, and uploading digital video files

FIG. 2 shows an example system 200 for capturing, editing, and uploading digital video files. The example system 200 includes one or more exemplary video snippet capture devices 206, an exemplary computing device 100 (from FIG. 1), and an example video sharing service 204. In addition, the computing device 100 executes an example light table video snippet editing application 202.

Each of the one or more video snippet capture devices 206 are communicatively coupled to the computing device 100. In turn, the computing device 100 is communicatively coupled to the video sharing service 204. The one or more video snippet capture devices 206 implement functionality to capture and store digital video files. For example, a video snippet capture device may be a mobile telephone equipped with a camera and digital image digitizing hardware and/or software. The mobile telephone may further implement functionality and hardware to transmit each video file over a mobile phone connection such as the Global System for Mobile Communications (GSM), a firewire or universal serial bus (USB) connection, a network connection such as Bluetooth™, or the like.

The video sharing service 204 may be a World Wide Web site such as Microsoft Soapbox, a centralized video hosting application maintained by a mobile phone service provider, or the like. The video sharing service 204 may provide functionality to a user to store digital video files and allow others to view the stored digital video files. The video sharing service 204 may also provide functionality for a user to directly capture video to the video sharing service 204, or may provide functionality for a user to upload previously stored and/or edited video to the video sharing service 204.

Turning now to the computing device 100, the light table video snippet editing application 202 executed by the computing device 100 opens, edits, and stores digital video files. The light table video snippet editing application 202 includes one or more user interface controls functioning to allow a user to manipulate one or more digital video files in a variety of ways. For example, the light table video snippet editing application 202 may provide a user interface control and functionality for producing a finished digital video file by stacking a number of user interface controls. In an alternative example, the light table video snippet editing application 202 may provide a user interface control and functionality for producing a finished digital video file by dragging and dropping user interface controls into a timeline user interface control. The resulting finished digital video file may then be uploaded or streamed directly to the video sharing service 204.

The example system 200 is just one example of a system for capturing video snippets, editing with a light table video snippet editing application, and uploading the result to a video sharing service. It is to be appreciated that any number of types of devices may capture digital video and send the digital video to a computing device 100 for storage. It is also to be appreciated that the computing device 100 may act as a video capture device and store captured digital video files locally. Furthermore, the computing device 100 may act as a video sharing service 204 by providing access to finished digital video files to clients over a network connection.

Figure 3:
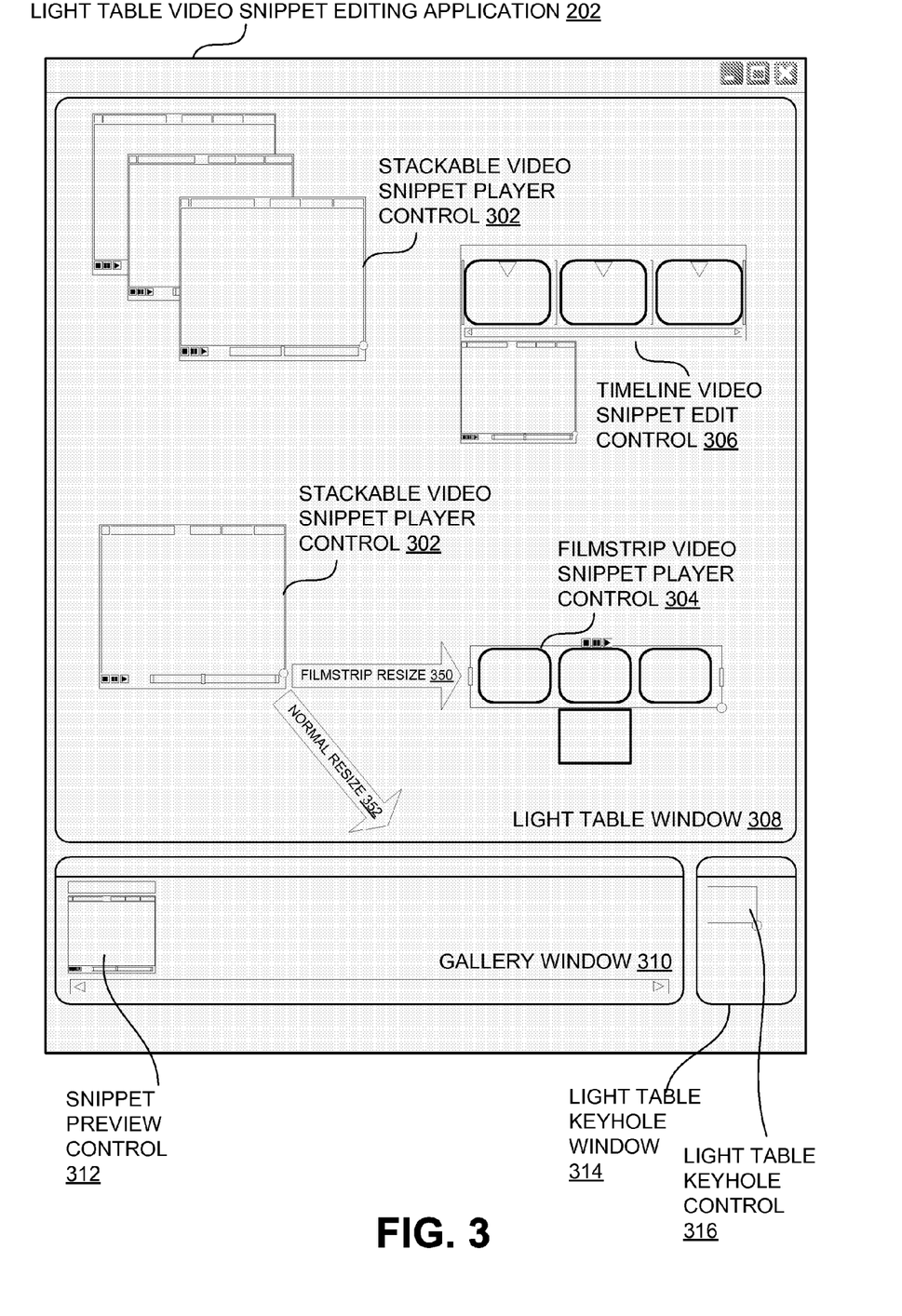
FIG. 3 shows detail of an example light table video snippet editing application user interface.

Turning now to FIG. 3, FIG. 3 shows detail of an example light table video snippet editing application user interface 202 (from FIG. 2). The light table video snippet editing application user interface 202 is comprised of three main windows: a light table window 308, a gallery window 310, and a light table keyhole window 314.

The gallery window 310 provides a list of video clips that may be clicked on and dragged into the light table window 308 for editing. The light table keyhole window 314 provides a "keyhole" view of the light table window 308. The entire light table window 308 may not be visible and the light table keyhole window 314 provides a light table keyhole control 316 which a user may click on and drag to change the view of the light table window 308.

The gallery window 310 includes any number of snippet preview control(s) 312 that represent a stored digital video file. A snippet preview control 312 may "pop-up", or, present a set of controls that function to play, pause, stop, trim beginning, trim ending, and selectively advance or reverse playback of selected frames of the digital video file represented by the snippet preview control 312. The snippet preview control 312 may further implement functionality to control the preview of the digital video file represented by the snippet preview control 312 through "scrubbing" the snippet preview control 312. Such "scrubbing" functionality may be the selective playback of a series of frames of video in the digital video file started when a user clicks on the snippet preview control 312 and drags the pointing device forward or backward across the snippet preview control 312. The snippet preview control 312 may also pop-up a set of information including a number representing the trimmed first frame of the digital video file, a number representing the trimmed last frame of the digital video file, and a number representing the current frame of the digital video file being displayed by the snippet preview control 312.

A user may click on a snippet preview control 312 and drag the snippet preview control 312 into the light table window 308. Once the snippet preview control 312 has been dragged to the light table window, the digital video file represented by the snippet preview control 312 is replaced by a stackable video snippet player control 302. The stackable video snippet player control 302 may be filmstrip resized 350 such that it is transformed to or replaced by a filmstrip video snippet player control 304. Accordingly, a stackable video snippet player control 302 may be resized normally 352 to a larger or smaller size.

Finally, a user may right click in the light table window 308 or may select a menu item from the main window of the light table video snippet editing application 202 to create a new timeline video snippet edit control 306. Once the timeline video snippet edit control 306 has been created, the user may drag any number of the stackable video snippet player control 302 or filmstrip video snippet player control 304 into the snippet edit control 306.

The functioning of the stackable video snippet player control 302 will be described in more detail in the discussion of FIG. 4. The functioning of the filmstrip video snippet player control 304 will be described in more detail in the discussion of FIG. 5. The functioning of the timeline video snippet edit control 306 will be described in more detail in the discussion of FIG. 6.

Figure 4:
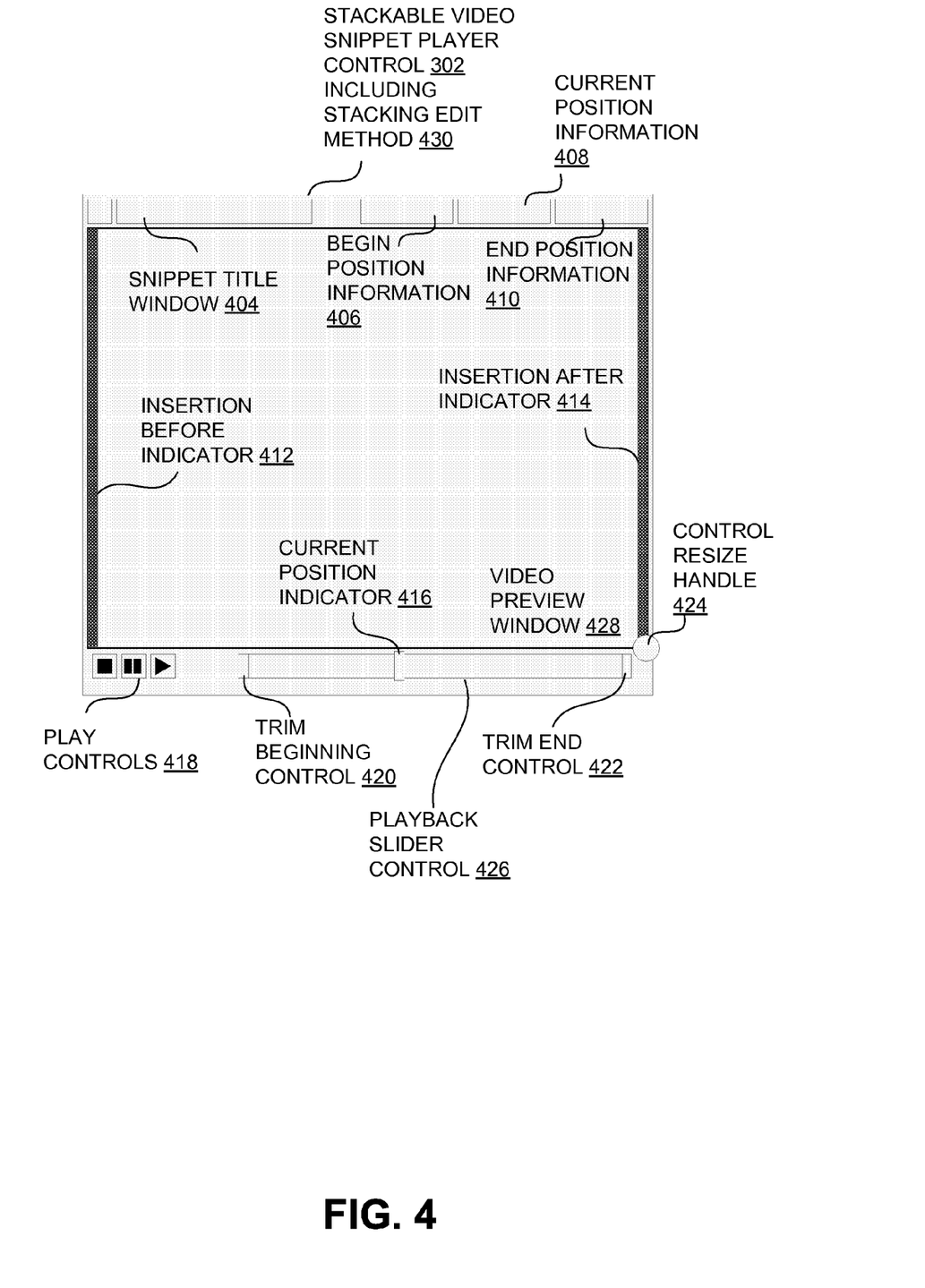
FIG. 4 shows an example stackable video snippet player control.

Turning now to FIG. 4, a stackable video snippet player control 302 is described in more detail. Note that the stackable video snippet player control 302 includes a stacking edit method 430 that will be described in more detail in the discussion of FIG. 7. The stackable video snippet player control 302 includes a number of other controls for manipulating playback and displaying information regarding the digital video file associated with the stackable video snippet player control 302. The stackable video snippet player control 302 also includes visual indications of where the stackable video snippet player control 302 will be placed when dragged on top of another stackable video snippet player control 302.

The stackable video snippet player control 302 includes a snippet title window 404, a begin position information window 406, a current position information window 408, and an end position information window 410. The stackable video snippet player control 302 also includes play controls 418, and a playback slider control 426 that includes a trim beginning control 420, a trim end control 422 and a current position indicator 416. Finally, the stackable video snippet player control 302 includes an insertion before indicator 412, an insertion after indicator 414, and a control resize handle 424.

The play controls 418 allow a user to manipulate playback of the digital video file associated with the stackable video snippet player control 302 in the video preview window 428. For example, the play controls 418 may include a stop button, a pause button, a play button, or the like. The playback slider control 426 allows a user to advance or decrease the displayed frame of the digital video file by clicking on the current position indicator 416 and moving the current position indicator 416 back or forwards along the playback slider control 426. A user may further set a beginning trim point by moving the trim beginning control 420 to a point on the playback slider control 426 corresponding to the desired beginning trim point. Similarly, a user may set an end trim point by moving the trim end control 422 to a point on the playback slider control 426 corresponding to the desired end trim point.

A first stackable video snippet player control 302 may be clicked and dragged over a second stackable video snippet player control 302. The first and second stackable video snippet player control 302 may be considered to be a combined video clip with the digital video corresponding to the first stackable video snippet player control 302 occurring first in the combined video clip and the digital video corresponding to the to the second stackable video snippet player control 302 occurring second in the combined video clip.

A user may then drag a third stackable video snippet player control 302 over the stacked first and second stackable video snippet player control 302. If the third stackable video snippet player control 302 is moved to location where the third stackable video snippet player control 302 will be placed before the second stackable video snippet player control 302, the insertion before indicator 412 will highlight or otherwise provide such an indication. If the third stackable video snippet player control 302 will be placed after the second stackable video snippet player control 302, the insertion after indicator 414 will highlight or otherwise provide such an indication.

The insertion before indicator 412 and insertion after indicator 414 may be presented using any visual style and may be located at any location within the stackable video snippet player control 302. The insertion before indicator 412 and insertion after indicator 414 may provide a visual indication by highlighting, changing color, providing an audio signal, playing an animation, or the like.

Turning now to the windows of the stackable video snippet player control 302 that display information about the digital video file associated with the stackable video snippet player control 302, the snippet window title 404 may include the title of the digital video file associated with the stackable video snippet player control 404. The title may be entered by a user, may be drawn from text or metadata associated with the digital video file, may be the actual name of the digital video file, or the like. The begin position information window 406 displays the frame number of the first frame of the digital video file associated with the stackable video snippet player control 302. For example, if a user has trimmed the video using the trim beginning control 420, the frame indicated by the position of the trim beginning control 420 is displayed in the begin position information window 406.

Similarly, the end position information window 410 displays the frame number of the last frame of the digital video file associated with the stackable video snippet player control 302. Finally, the current position information window 408 displays the frame number of the digital video file corresponding to the stackable video snippet player control 302 currently displayed in the video preview window 424.

Once the user has stacked the first, second, and third stackable video snippet player controls 302, the user create a digital video file that combines the digital video files associated with the first, second, and third stackable video snippet player controls 302 trimmed appropriately as indicated by the trim controls for each stackable video snippet player control 302. For example, the user may right click on any of the first, second, or third stackable video snippet player controls 302 to display a context menu and select a menu option to create the compiled digital video file. Alternatively, the user may select a menu item from the menu of the application hosting the first, second, and third stackable video snippet player controls 302.

The stackable video snippet player control 302 also includes a control resize handle 424. When a user clicks on and drags the control resize handle 424 such that the aspect ratio of the video preview window 424 is maintained, for example, at a forty-five degree angle down and to the right, the video preview window 424 is scaled to a larger size. However, if the user clicks on and drags the control resize handle 424 such that the length of the stackable video snippet player control 302 exceeds the native width of the digital video file corresponding to the stackable video snippet player control 302 by a predetermined margin, the stackable video snippet player control 302 switches to a filmstrip video snippet player control 304 (from FIG. 3). However, it is to be appreciated this the control resize handle 424 is only one method of resizing and any method may be used.

Figure 5:
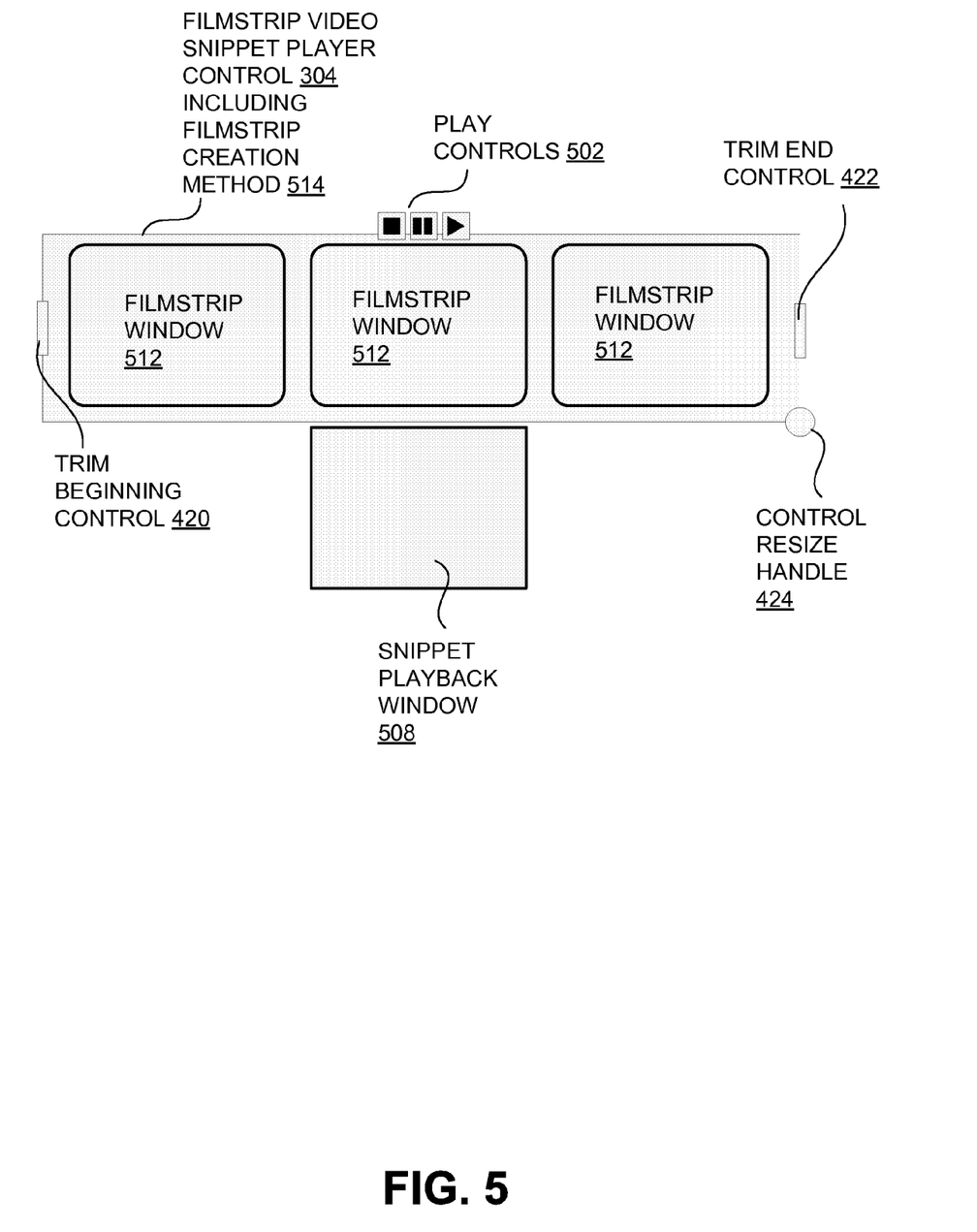
FIG. 5 shows an example filmstrip video snippet player control.

In particular, FIG. 5 shows an example filmstrip video snippet player control 304 (from FIG. 3). The filmstrip video snippet player control 304 may be an alternative display configuration of the stackable video snippet player control 302 (from FIG. 3). For example, the stackable video snippet player control 302 may "morph" or change to the filmstrip video snippet player control 304 in response to a user clicking and dragging the control resize handle 424 (from FIG. 4) of the stackable video snippet player control 302.

Similarly, if a user clicks and drags the control resize handle 424 on the filmstrip video snippet player control 304, the filmstrip video snippet player control 304 "morphs" or changes back to the stackable video snippet player control 302. It should also be noted that a filmstrip video snippet player control 304 may execute a stacking edit method 430 (from FIG. 4) just as a stackable video snippet player control 302.

The filmstrip video snippet player control 304 includes a filmstrip creation method 514 that will be discussed with more detail in the discussion of FIG. 8. The filmstrip video snippet player control 304 includes one or more filmstrip window(s) 512. The number of filmstrip window(s) 512 is dependent on the width of the filmstrip video snippet player control 304. The filmstrip window(s) 512 display selected individual frames from a digital video file associated with the filmstrip video snippet player control 304.

The filmstrip video snippet player control 304 also includes play controls 502, a video snippet playback window 508, and a control resize handle 424 (from FIG. 4). The filmstrip video snippet player control 304 further includes a trim beginning control 420 (from FIG. 4) and a trim end control 422 (from FIG. 4). Each of the trim beginning control 420 and the trim end control 422 function similarly to those described in the discussion of FIG. 4. The filmstrip video snippet player control 304 also includes a control resize handle 424 (from FIG. 4) that functions similarly to the control resize handle 424 described in the discussion of FIG. 4.

The filmstrip window(s) 512 display individual frames of the digital video file associated with the filmstrip video snippet player control 304. The number of frames and the frames selected for display may be selected in accordance with the function of the filmstrip creation method 514; however, any suitable method for selecting individual frames to display may be used.

The snippet playback window 508 plays the digital video file corresponding to the filmstrip video snippet player control 304. Play of the digital video file may either be controlled by the play controls 502 or by the user "scrubbing" over the filmstrip windows 512. As previously discussed, "scrubbing" the filmstrip video snippet player control 304 results in the display of individual frames of the digital video file when the user clicks and drags a pointing device forwards or backwards across the filmstrip video snippet player control 304.

For example, if a user clicks and holds the pointing device over the first filmstrip window 512, the first frame of the digital video file corresponding to the filmstrip video snippet player control 304 will be displayed in the snippet playback window 508. As the user drags the pointer to the right, the remaining frames of the digital video file corresponding to the filmstrip video snippet player control 304 are played in succession at the same rate as the pointer is being dragged. Thus, as the user drags more quickly, frames play more quickly. As the user drags more slowly, frames play more slowly. Because the user can see the static images of the digital video file in the filmstrip video snippet player control 304, the user is better able to search back and forth through the digital video file to select frames of interest.

Figure 6:
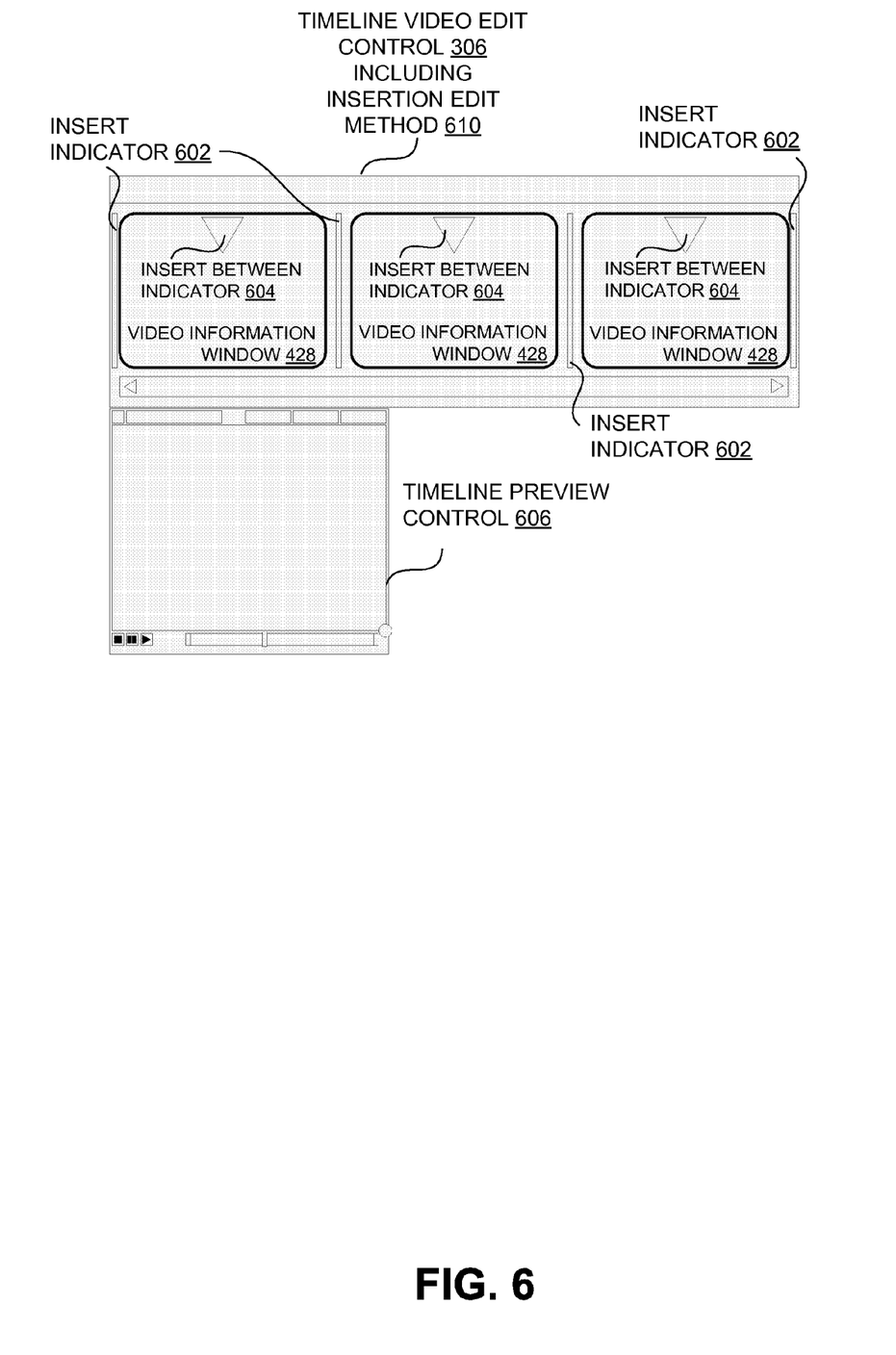
FIG. 6 shows an example timeline video edit control.

Turning now to FIG. 6, FIG. 6 shows an example timeline video edit control 306. The timeline video edit control 306 (from FIG. 3) includes an example insertion edit method 610 that will be discussed in more detail in the discussion of FIG. 9. The timeline video edit control 306 includes functionality for a user to drag one or more digital video clips corresponding to either a stackable video snippet player control 302 (from FIG. 3), a filmstrip video snippet player control 304 (from FIG. 3), or any other representation of the digital video clip and place each into sequential order within the timeline video snippet edit control 306.

The timeline video edit control 306 includes one or more insert indicator(s) 602, one or more "insert between" indicator(s) 604, and a timeline preview control 606. The timeline video edit control 306 also includes one or more video information window(s) 428 that displays a static image or other information representative of a digital video file represented by the video information window 428. Each of the one or more insert indicator(s) 602 and one or more insert between indicator(s) 604 activate in response to a user dragging an appropriate control representing a digital video clip into the timeline video edit control 306.

For example, if a user drags a first control representing a digital video file into an empty timeline video edit control 306, the first control will take the first position available in the timeline video edit control 306. When a user drags a second control representing a digital video file into the timeline video edit control 306, the user may drag the second control over top of the first control. If the second control is within a threshold area of the first control, for example, in the first third, the insert indicator 602 immediately to the left of the first control highlights. If the user releases the second control, the second control will replace the first control in the first position in the timeline video edit control 306.

If the second control is within a threshold area in the middle area of the first control, for example, within the middle third, the "insert between" indicator 604 of the first control highlights. If the user releases the second control, the digital video file represented by the first control is split into two portions at or approximately in the center. The result is that the digital video file represented by the second control will be inserted in the middle of digital video file represented by the first control. Note that if the user has previously indicated alternate beginning and/or end points for the digital video file, the digital video file represented by second control may be placed at the mid-point of the new beginning and/or end points.

If the second control is within a threshold area in the right side of the first control, for example, within the last third, the insert indicator 602 to the right of the first control highlights. In response to the user dropping or releasing the second control, the second control appears immediately to the right of the first control.

The timeline preview control 606 may be included with the timeline video edit control 306 or may be presented in response to a user request such as right-clicking the timeline video edit control 306 to present a context menu. The timeline preview control 306 displays the combined result of each of the digital video files included in the timeline video edit control 306 in order. Such a context menu may further include user interface elements that, when selected, save the combined result of the timeline video edit control 306.

Figure 7:
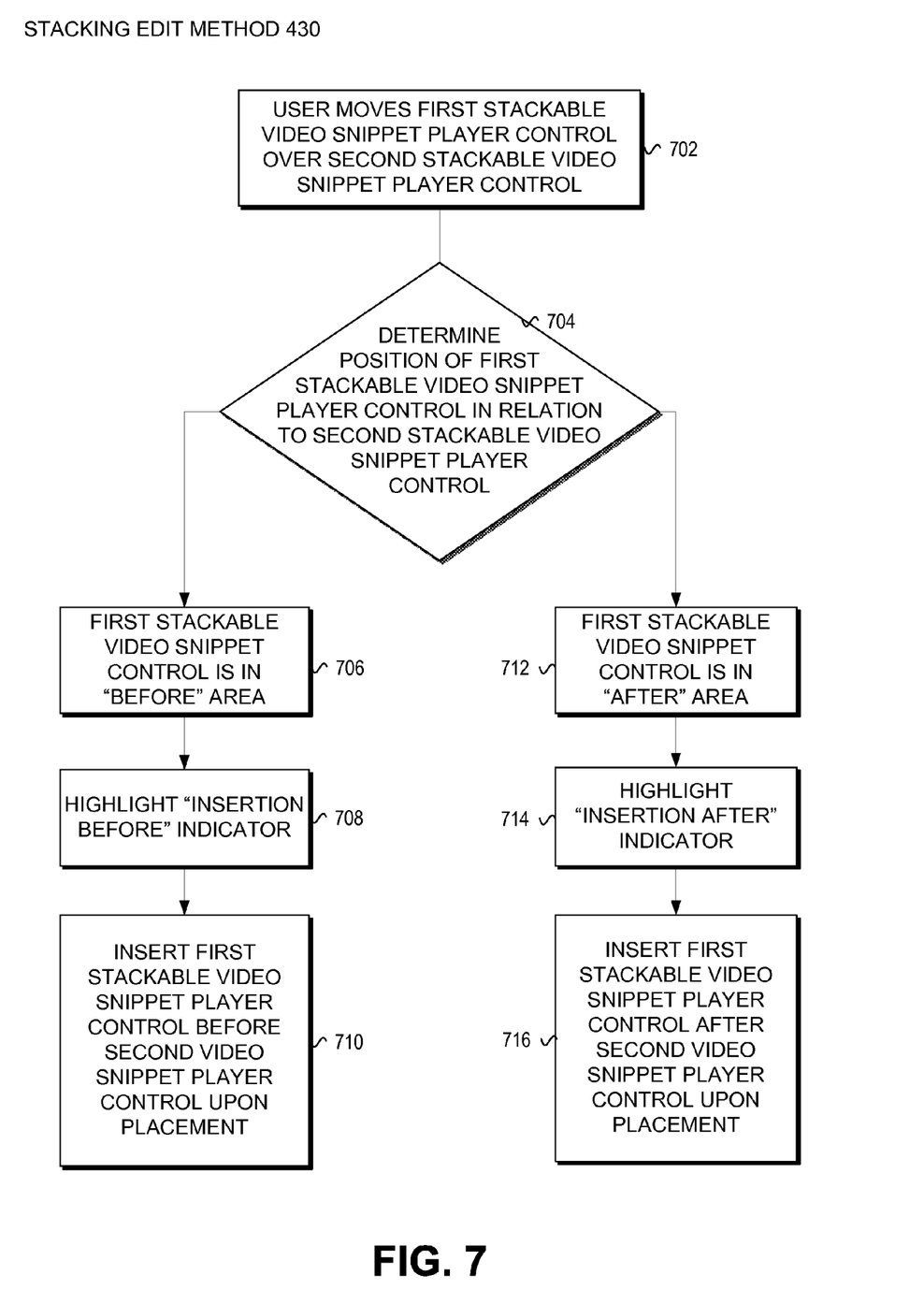
FIG. 7 shows an example stacking edit method.

Turning now to FIG. 7, FIG. 7 shows an example stacking edit method 430. Block 702 refers to an operation in which it is determined if a user of a first stackable video snippet player control, for example the stackable video snippet player control 302 from FIG. 3, has clicked on and dragged a first stackable video snippet player control into an area on top of a second stackable video snippet player control.

Block 704 refers to an operation to determine the position of the first stackable video snippet player control in relation to the second stackable video snippet player control. Such a determination may be made by comparing the location of a predetermined area on the first stackable video snippet player control to a predetermined location on the second stackable video snippet player control.

For example, the area corresponding to the mouse pointer on the first stackable video snippet player control may be compared to one or more predetermined areas included in the second stackable video snippet player control. The predetermined areas may be the left half of the second stackable video snippet player control and the right half of the stackable video snippet player control. The mouse pointer and the first stackable video snippet player control may fall within the left half of the second stackable video snippet player control or may fall within the right half of the second stackable video snippet player control. It is to be appreciated, however, that this is an example only and the predetermined area defined by the second stackable video snippet player control may comprise any number and configuration of predetermined areas.

Block 706 refers to an operation in which it has been determined that the first stackable video snippet player control falls within an area defined as "before" on the second stackable video snippet player control. As has been discussed, any area on the second stackable video snippet player control may be defined as "before" the second stackable video snippet player control. Typically, the area defining the left half of the second stackable video snippet player control from the center line of the second stackable video snippet player control may be defined as "before".

Block 708 refers to an operation to an operation to highlight the "insertion before" indicator on the second stackable video snippet player control. Such an indicator may be a highlighted line along the left hand side of the second stackable video snippet player control. However, any visual indication on the second stackable video snippet player control may be used.

Block 710 refers to an operation in which the first stackable video snippet player control is inserted before the second stackable video snippet player control in response to a user's instruction to place the first control in the sequence. The user may indicate the instruction by releasing the mouse button clicked and held on the first control, for example.

Block 712 refers to an operation in which it has been determined that the first stackable video snippet player control falls within an area defined as "after" on the second stackable video snippet player control. As has been discussed, any area on the second stackable video snippet player control may be defined as "after" the second stackable video snippet player control. Typically, the area defining the right half of the second stackable video snippet player control from the center line of the second stackable video snippet player control may be defined as "after".

Block 708 refers to an operation to an operation to highlight the "insertion after" indicator on the second stackable video snippet player control. Such an indicator may be a highlighted line along the right hand side of the second stackable video snippet player control. Any visual indication on the second stackable video snippet player control may be used, however.

Block 710 refers to an operation in which the first stackable video snippet player control is inserted after the second stackable video snippet player control in response to a user's instruction to place the first control in the sequence. The user may indicate the instruction by releasing the mouse button clicked and held on the first control, for example.

Figure 8:
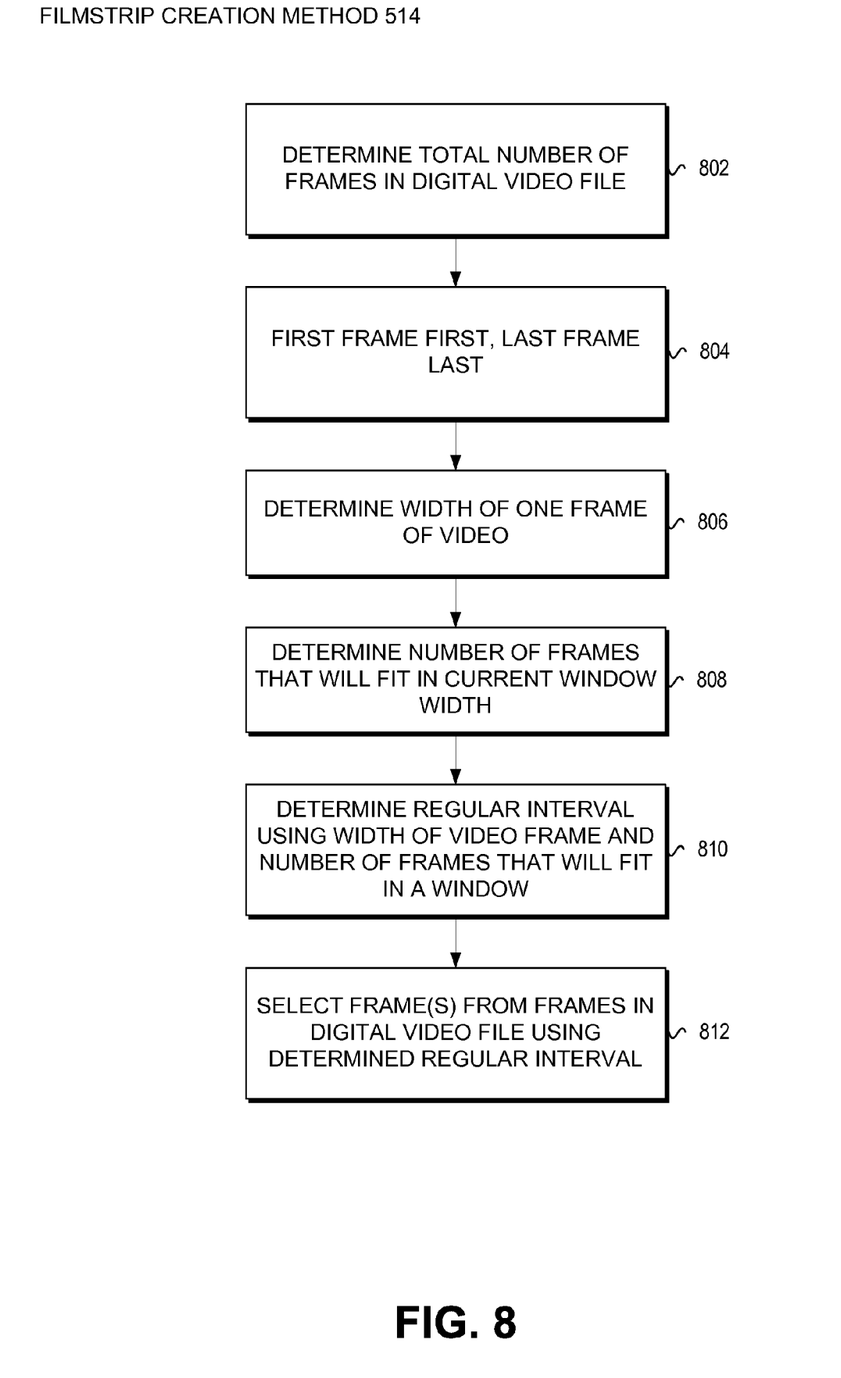
FIG. 8 shows an example method of creating a filmstrip view.

Turning now to FIG. 8, FIG. 8 shows an example 514 method for creating a filmstrip view. Block 802 refers to an operation in which the total number of frames included in a digital video file is calculated. The total number of frames in the digital video file may be calculated using any method. A digital video file may be spatially or temporally compressed and the number of uncompressed frames may be used to calculate the total number of frames, for example.

Block 804 may refer to an operation in which the first frame of the digital video file is selected as the first static video frame to be displayed and the last frame of the digital video file is selected as the last static video frame to be displayed. Note that the first and last video frames of the digital video file may not correspond exactly to the first and last frame in the digital video file, respectively. For example, a user may have selected a different beginning or end frame using a trim control and in this case, the first trimmed frame may be used as the first static video frame to be displayed and the last trimmed frame may be used as the last static video frame to be displayed.

Block 806 refers to an operation in which the width of a frame of the digital video file is determined. Such a determination may be performed using any method. The native resolution of the digital video file may be used, for example. In particular, an example digital video file may be of a resolution of 640 pixels high by 480 pixels wide. In this example, the width of one frame of the digital video file is 480 pixels. In another example, the width of a frame of the digital video file may be predetermined. The width of a video file may be set to be a fixed width set either by the creator of a filmstrip control or taken from a user's specified preference, for example. Note that while this example is measured in pixels, any unit of measure may be used.

Block 808 refers to an operation in which the number of frames that will fit within the current window is determined. Such a determination may be made using any method; for example, the width of a single frame of the digital video file determined at block 806 may be compared to the current width of the current window. If the width of the current window is 1000 pixels wide, two frames 480 pixels wide are 960 pixels wide in total and therefore two frames of the digital video file will fit within the current window. Note that white space may be included in between frames to improve the visual layout of the digital video frames in the current window.

Block 810 refers to an operation in which a regular interval at which static frames of the digital video file should be selected for display in the current window is determined. Such a determination may be made using the total number of frames of the digital video file as determined at block 802, the width of a frame of the digital video file determined at block 806, and the number of frames that will fit into the current window determined at block 810. For example, if a digital video file is 10 frames in length, and the current window may display 5 frames of video, the determined interval is 2.

Block 812 refers to an operation in which the regular interval determined at block 810 is used to select static frames from the digital video file for display in the current window. For example, if the interval determined at block 810 is 2, the first frame determined at block 804 is used as the first frame; each second frame from the digital file is then selected for display ending with the last frame also determined at block 804.

Figure 9:
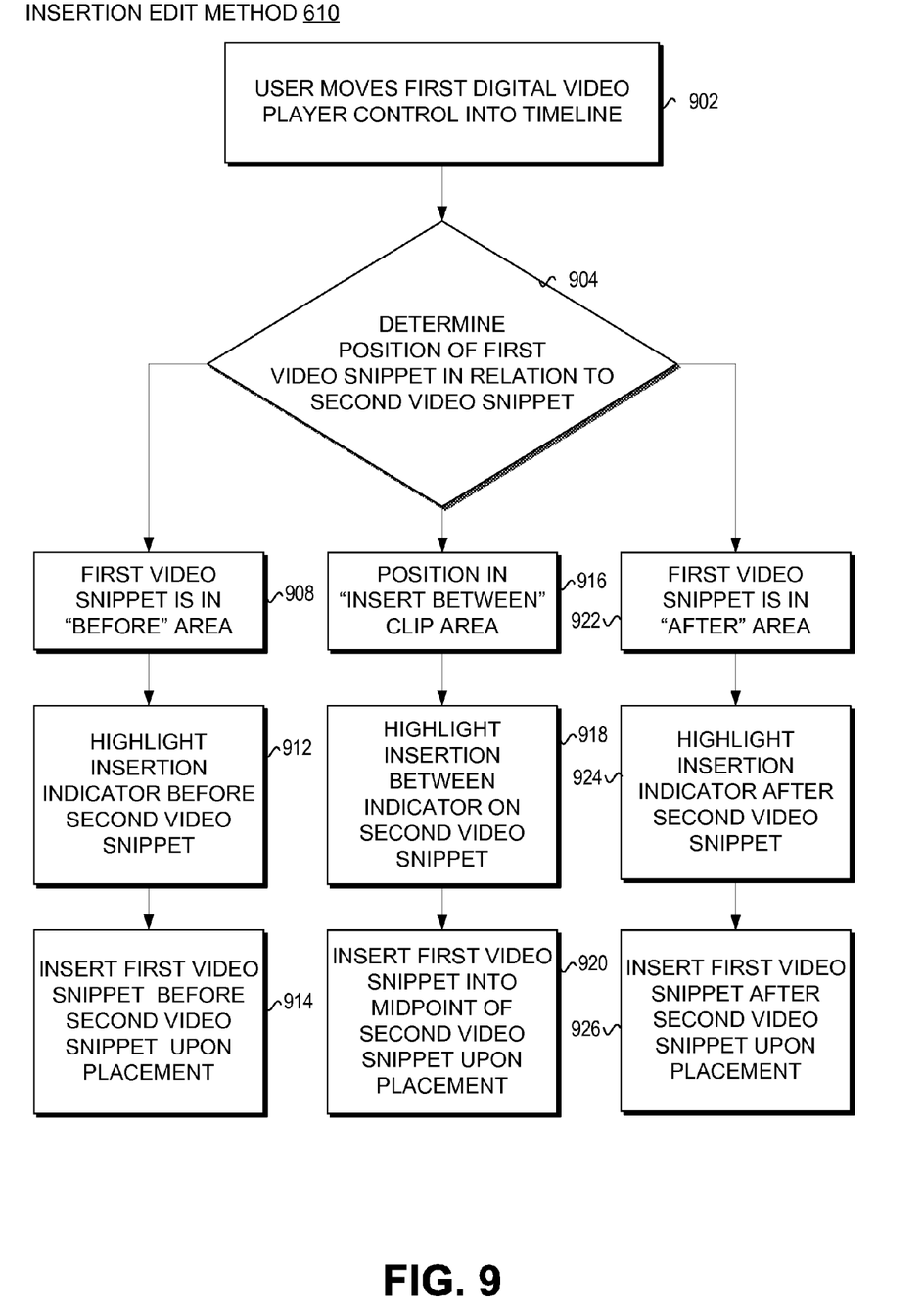
FIG. 9 shows an example insertion edit method.
Figure 10:
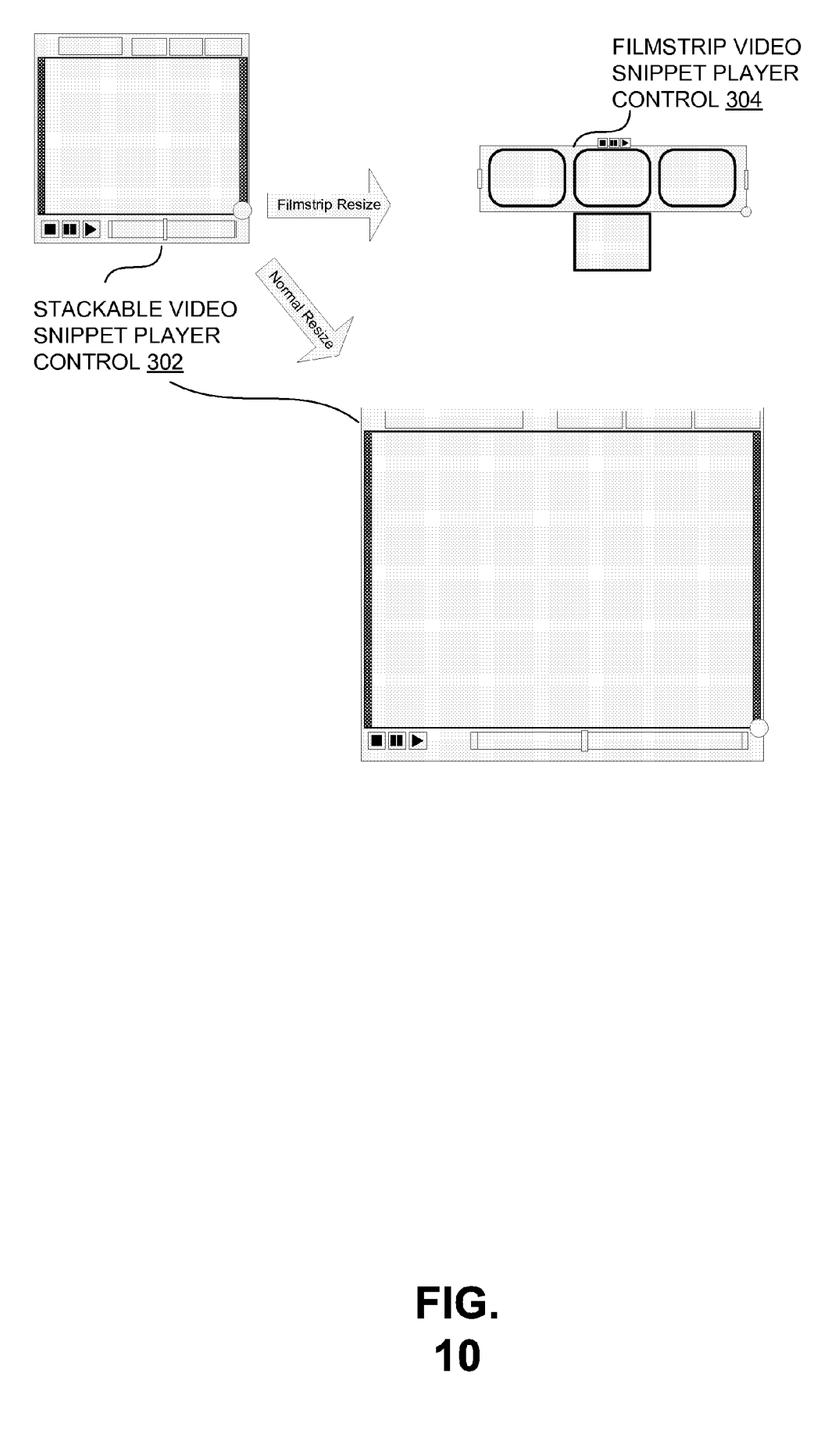
FIG. 10 shows an example stackable video snippet player control and an example filmstrip video snippet player control.

Turning now to FIG. 9, FIG. 9 shows an example insertion edit method 610. Block 902 refers to an operation in which it is determined if a user of a first digital video player control has clicked on and dragged the first stackable video snippet player control into a timeline editing control, for example, the timeline video snippet edit control 306 from FIG. 6.

Block 904 refers to an operation to determine the position of the first digital video player control in relation to a second digital video player control included in the timeline editing control. Such a determination may be made by comparing the location of a predetermined area on the first digital video player control to a predetermined location on the second digital video player control.

For example, the area corresponding to the mouse pointer on the first digital video player control may be compared to one or more predetermined areas included in the second digital video player control. The predetermined areas may be the left one-third of the second digital video player control, the middle one-third of the second digital video player control, and the right one-third of the second digital video player control. In this example the coordinates corresponding to the location of the mouse pointer on the first digital video player control may fall within any of the three predetermined areas on the second digital video player control. It is to be appreciated that this is an example only and the predetermined area defined by the second stackable video snippet player control may comprise any number and configuration of predetermined areas.

Block 908 refers to an operation in which it has been determined that the first digital video player control falls within an area defined as "before" on the second digital video player control. As has been discussed, any area on the second digital video player control may be defined as "before". Typically, the area defining the left most one-third of the second digital video player control may be defined as "before".

Block 912 refers to an operation to an operation to highlight the "insertion before" indicator on the second digital video player control. Such an indicator may be a highlighted line to the left of the second digital video player control within the timeline edit control. Any visual indication on the second digital video player control may be used.

Block 914 refers to an operation in which the first digital video player control is inserted before the second digital video player control in response to a user's instruction to place the first control in the sequence. For example, the user may indicate the instruction by releasing the mouse button clicked and held on the first control.

Block 916 refers to an operation in which it has been determined that the first digital video player control falls within an area defined as "insert between" on the second digital video player control. As has been discussed, any area on the second digital video player control may be defined as "insert between". Typically, the area defining the middle one-third of the second digital video player control may be defined as "insert between".

Block 918 refers to an operation to an operation to highlight the "insertion between" indicator on the second digital video player control. Such an indicator may be a highlighted arrow in the middle of the second digital video player control within the timeline edit control. Any visual indication on the second digital video player control may be used.

Block 914 refers to an operation in which the first digital video player control is inserted in between the second digital video player control in response to a user's instruction to place the first control in the sequence. For example, the user may indicate the instruction by releasing the mouse button clicked and held on the first control. Note that the digital video file represented by the first digital video player will be split and the digital video file represented by the second digital video player will be inserted in between the two halves of the digital video file represented by the first digital video player.

Block 922 refers to an operation in which it has been determined that the first digital video player control falls within an area defined as "after" on the second digital video player control. As has been discussed, any area on the second digital video player control may be defined as "after". Typically, the area defining the right most one-third of the second digital video player control may be defined as "after".

Block 912 refers to an operation to an operation to highlight the "after" indicator on the second digital video player control. Such an indicator may be a highlighted line to the right of the second digital video player control within the timeline edit control. Any visual indication on the second digital video player control may be used.

Block 914 refers to an operation in which the first digital video player control is inserted after the second digital video player control in response to a user's instruction to place the first control in the sequence. For example, the user may indicate the instruction by releasing the mouse button clicked and held on the first control.

The invention claimed is:

1. A stackable video snippet player user interface control, comprising:
    an insertion before indicator that displays an indication that another user interface control will be placed before the stackable video snippet player user interface control in a sequence;
    an insertion after indicator that displays an indication that another user interface control will be placed after the stackable video snippet player user interface control in a sequence; and
    a video preview window for displaying a digital video file corresponding to the stackable video snippet player user interface control.

2. The stackable video snippet player user interface control of claim 1, wherein one or more computer-executable instructions associated with the stackable video snippet player user interface control and executed by the computer system implement the following operations:
    determine the position of a second user interface control in relation to the stackable video snippet player user interface control;

highlighting the insertion before indicator in response to determining the second user interface control falls within a first predetermined area on the stackable video snippet player user interface control; and highlighting the insertion after indicator in response to determining the second user interface control falls within a second predetermined area on the stackable video snippet player user interface control.

3. The stackable video snippet player user interface control of claim 1, further comprising a context menu to be displayed in response to a user command, the context menu displaying a command to save the compiled digital video file associated with the stackable video snippet player user interface control and any additional user interface controls determined to be in sequence with the stackable video snippet player user interface control.

4. The stackable video snippet player user interface control of claim 1, wherein the stackable video snippet player user interface control executes within a light table video snippet editing application.

5. The stackable video snippet player user interface control of claim 1, wherein the insertion before indicator is a vertical bar located on the left side of the video preview window.

6. The stackable video snippet player user interface control of claim 1, wherein the insertion after indicator is a vertical bar located on the right side of the video preview window.

* * * * *